(12) United States Patent
Banhardt et al.

(10) Patent No.: US 6,189,321 B1
(45) Date of Patent: Feb. 20, 2001

(54) DISTRIBUTOR

(75) Inventors: Volker Banhardt, Heidelberg; Burkhard Josuhn-Kadner, Laufenburg; Raiko Milanovic, Heidelberg; Volker Schüle, Leimen; Wolfgang Waldi, Nussloch-Maisbach; Hans-Jürgen Weidemann, Speyer, all of (DE)

(73) Assignee: ABB Patent GmbH, Mannheim (DE)

( * ) Notice: Under 35 U.S.C. 154(b), the term of this patent shall be extended for 0 days.

(21) Appl. No.: 09/289,492

(22) Filed: Apr. 9, 1999

(30) Foreign Application Priority Data

Apr. 9, 1998 (DE) .............................................. 198 15 914

(51) Int. Cl.⁷ ...................................................... F02C 1/00
(52) U.S. Cl. ................................. 60/739; 60/734; 60/741; 60/746; 60/39.281
(58) Field of Search ............................... 60/739, 734, 741, 60/746, 39.06, 39.281, 39.31

Primary Examiner—Timothy S. Thorpe
Assistant Examiner—Eric D. Hayes
(74) Attorney, Agent, or Firm—Herbert L. Lerner; Laurence A. Greenberg; Werner H. Stemer

(57) ABSTRACT

A distributor for supplying burners of a gas turbine with fuel, air and coolant. Prior art distributors contain a combination of ring lines and tie lines, over which the fuel is distributed to individual burners. It is very complicated and expensive to replace defective components, and in some cases the entire apparatus has to be dismantled to do so. The distributor of the invention has two or more modules, depending on the number of burners, which are assembled from distributor units and regulating units in such a way that they can be taken apart again. For each burner, at least one regulating unit is provided, from which at least one supply line for the fuel, air and coolant extends to the burner.

10 Claims, 6 Drawing Sheets

DISTRIBUTOR

BACKGROUND OF THE INVENTION

Field of the Invention

The invention relates to a distributor for supplying burners of a gas turbine with fuel, air and coolant.

Such distributors are used to deliver fuel, each in a desired composition and a required quantity, to burners of gas turbines.

Apparatuses of this type thus far known include a combination of ring lines and tie lines through which the fuel is distributed to the individual burners. It is very complicated and expensive to replace defective components. In nearly every case, it is not merely one component that has to be removed and replaced with a new one. On the contrary, it is nearly always necessary to take out a plurality of components for repair. In extreme cases, the entire apparatus has to be dismantled. In addition, the known apparatus does not make it possible to regulate the burners in a targeted way. They also lack a testing device with which leaks can be found in the pipeline system between the distributors and the burners. Moreover, in none of the burners can wear, soiling and aging be ascertained.

SUMMARY OF THE INVENTION

It is accordingly an object of the invention to provide a distributor that overcomes the above-mentioned disadvantages of the prior art devices of this general type.

With the foregoing and other objects in view there is provided, in accordance with the invention, a distributor for supplying burners of a gas turbine with fuel, air and coolant, the distributor including: at least one regulating unit to be connected to each burner of a gas turbine; at least one supply line connected to the at least one regulating unit and extending to the burner for conducting fuel, air and coolant to the burner; a distributor unit along with a defined number of regulating units forming a module; and feed lines connected to the distributor unit for conducting the fuel, the air and the coolant to the distributor unit.

In accordance with an added feature of the invention, the module is at least two modules provided for supplying a plurality of burners and each of the burners having an attachment flange, each of the at least two modules having at least one distributor unit, the regulating units of the distributor unit are positioned side by side in a same plane as the attachment flange of the burners.

In accordance with an additional feature of the invention, there is at least one valve disposed in each of the connecting lines; a measuring and regulating device; a first signal line connecting the at least one valve to the measuring and regulating device; a second signal line connected to the measuring and regulating device; sensors disposed in the connecting lines and connected to the second signal line, the sensors communicating over the second signal line with the measuring and regulating device; a control system unit; and a field bus line connected between the control system unit and the sensors.

In accordance with a concomitant feature of the invention, the at least one supply line is a plurality of supply lines and the burners are disposed in a circle at a predetermined, equal angular spacing from one another, the at least two modules positioned at a spacing from one another such that the burners disposed in the circle are disposed regionally in between the at least two modules, and the supply lines extending parallel, on an outside around the burners, in a vertical plane at a slight spacing from one another from the connection flange of each burner.

Other features which are considered as characteristic for the invention are set forth in the appended claims.

Although the invention is illustrated and described herein as embodied in a distributor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 4:
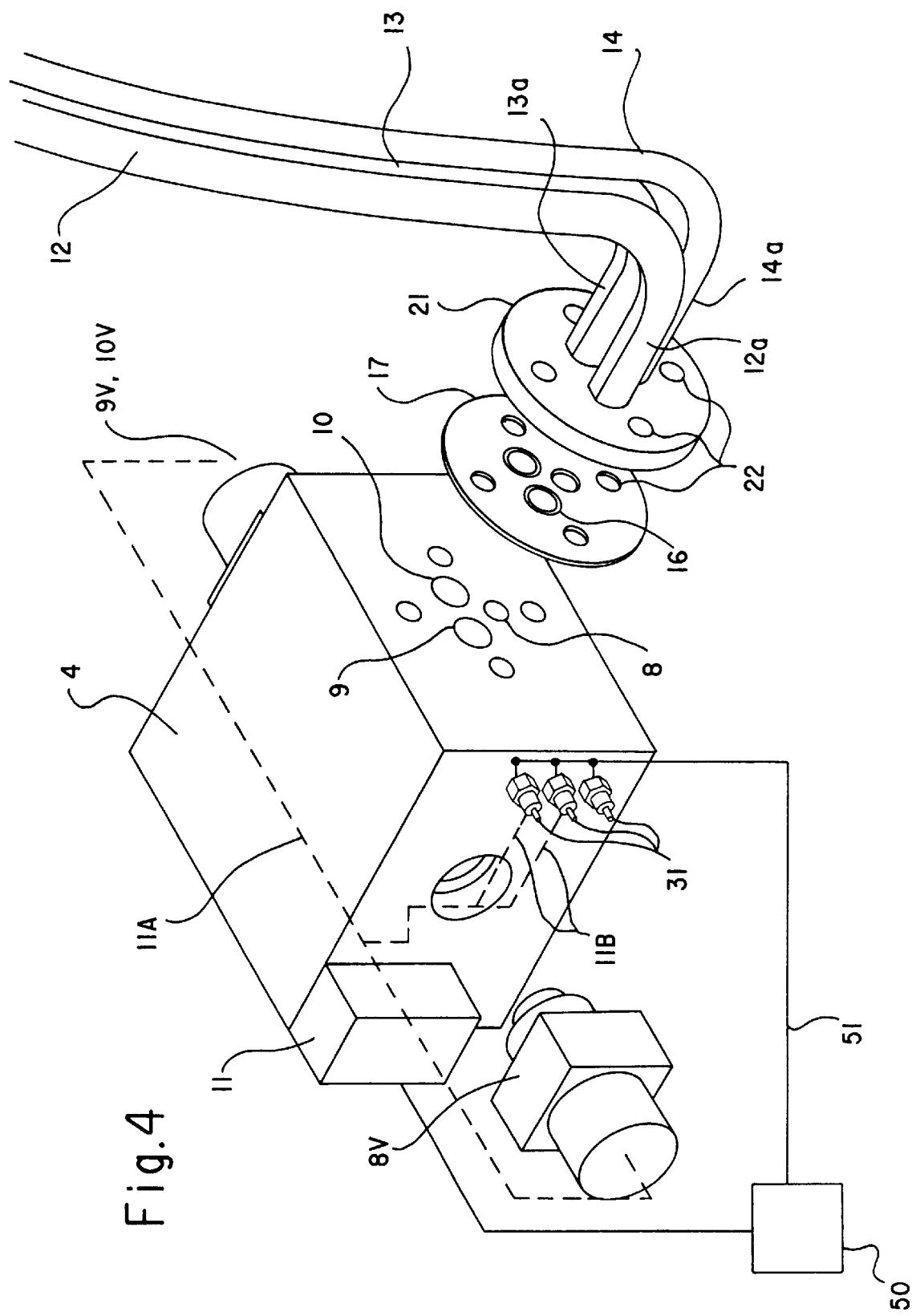
FIG. 4 is a perspective view of the regulating unit shown in FIG. 3.

In all the figures of the drawing, sub-features and integral parts that correspond to one another bear the same reference symbol in each case. Referring now to the figures of the drawing in detail and first, particularly, to FIG. 1 thereof, there is shown a distributor 1 with two modules 2. Each of the two modules 2 are put together from one distributor unit 2V and a plurality of regulating units 4 in such a way that they can be taken apart again. In the exemplary embodiment shown here, fifteen regulating units 4 are associated with each distributor unit 2V. The number of regulating units 4 depends on the total number of burners 15. Fuel, air and a coolant can be delivered to each module 2 via feed lines 5, 6, and 7. The regulating units 4 are intended for supplying the burners 15 with fuel, air and at least one coolant and for regulating the quantity of these media. Through each distributing unit 2V, three supply lines 5V, 6V, 7V are extended in the exemplary embodiment shown here (FIG. 2); their outward extending ends are joined to the feed lines 5, 6, 7. As FIG. 2 shows, the supply lines 5V, 6V, 7V are each provided with a respective branch 5Z, 6Z, 7Z in the region of each regulating unit 4. The branches 5Z, 6Z, 7Z, in the exemplary embodiment shown here, are aligned perpendicular to the supply lines 5V, 6V, and 7V. As shown in FIGS. 2 and 4, each branch 5Z, 6z, 7Z is connected to one connecting line 8, 9, 10 of the regulating unit 4, whose longitudinal axes extend parallel to and at a slight spacing from one another. As FIG. 4 shows, one valve 8V, 9V and 10V is incorporated into each connecting line 8, 9 and 10. The three valves 8V, 9V and 10V are actuated by a measuring and regulating device 11, to which the valves 8V, 9V and 10V are each connected via a respective signal line 11A. A microprocessor is preferably used as the measuring and regulating device 11. Each regulating unit 4, in the exemplary embodiment shown here, is provided with three sensors 31, which communicate with the internal regions of the connecting lines 8, 9 and 10. With the sensors 31, a pressure, temperature and flow rate of the fuel, air and coolant are detected. The sensors 31 are installed such that the measurement values are ascertained directly upstream of the connecting point between the regulating unit 4 and first ends 12A, 13A, 14A of the supply lines 12, 13, 14. Three further sensors 31 with the same function are installed on second ends 12B, 13B, 14B of the three supply lines 12, 13, 14, which each lead to one burner 15. All the sensors 31 communicate with the microprocessor 11 via signal lines 11B and with a control system unit 50 via field bush lines 51. The measurement signals ascertained by the sensors 31 are passed on for evaluation to the associated microprocessors and to the control system unit 50.

With the aid of the measurement signals, the operability of the associated burner is monitored by the microprocessor 11 of each regulating unit 4. If the actual value at the burner 15 ascertained from the measurement signals does not match a desired value specified by the control system unit 50, then the microprocessor changes the setting of the valves 8V, 9V and 10V in the connecting lines 8, 9, 10. If the microprocessor 11 determines that the actual value cannot be regulated to the desired value, then it sends a report to a display unit of the control system unit 50 indicating that the burner 15 should be checked for wear and soiling, or that the supply lines 12, 13, 14 between the regulating unit 4 and the burner 14 should be examined for leaks. As can be seen from FIG. 2, for the connection of the regulating unit 4 to the supply lines 12, 13, 14, the first ends 12A, 13A, 14A of these lines are provided with a common connection flange 21. A sealing washer 17 is disposed between the connection flange 21 and the regulating unit 4. The connection flange 21 is secured to the regulating unit 4 by non-illustrated screws.

Figure 5:
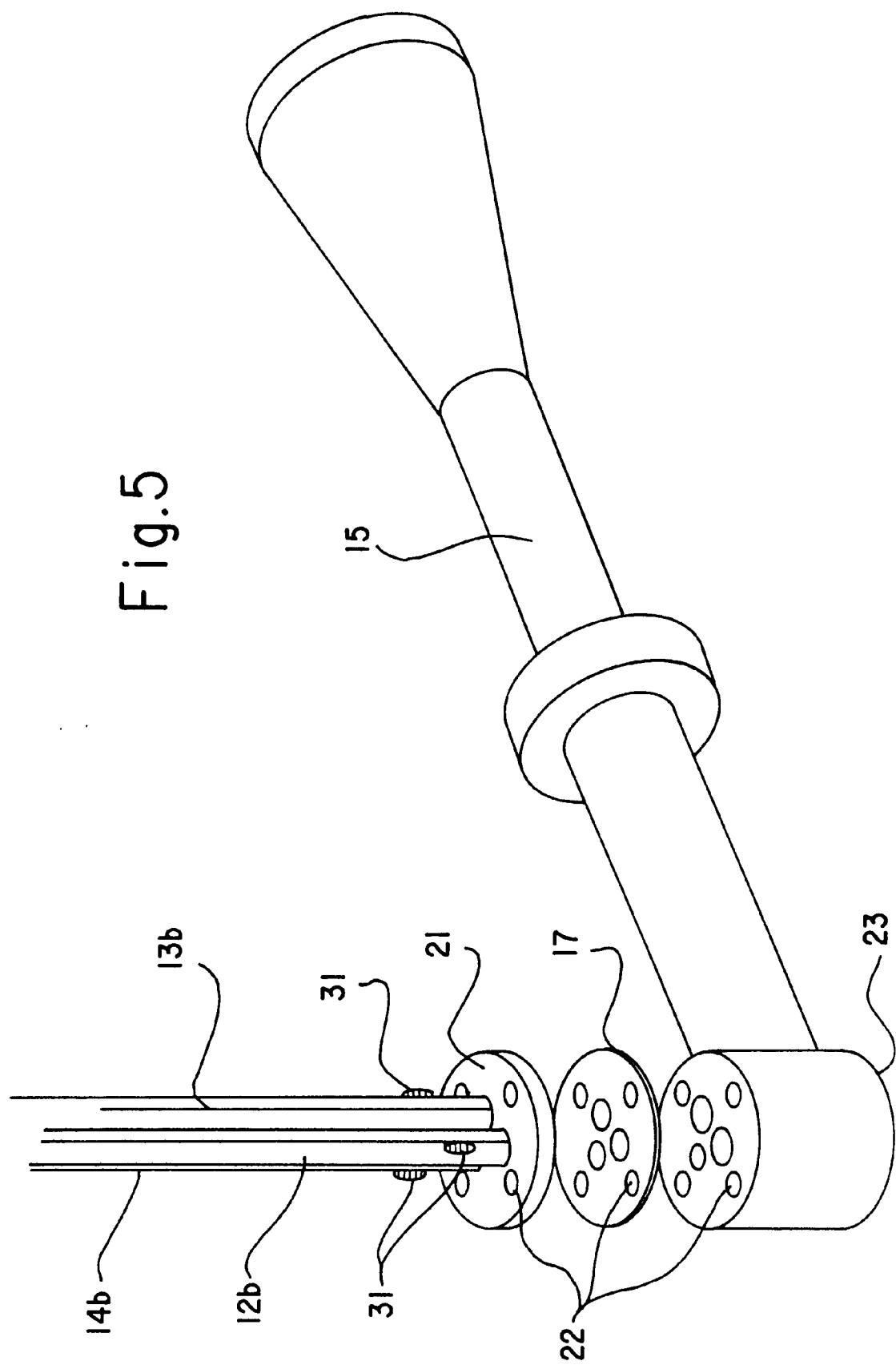
FIG. 5 is a perspective view of the burner with an attachment flange.

The burners 15 are disposed circularly at equal angular intervals depending on their number. Each burner 15 is provided with one attachment flange 23 (FIG. 5). For connecting the supply lines 12, 13, 14 to the attachment flange 23, the second ends 12B, 13B, 14B of the supply lines 12, 13, 14 are provided with the common connection flange 21.

Figure 6:
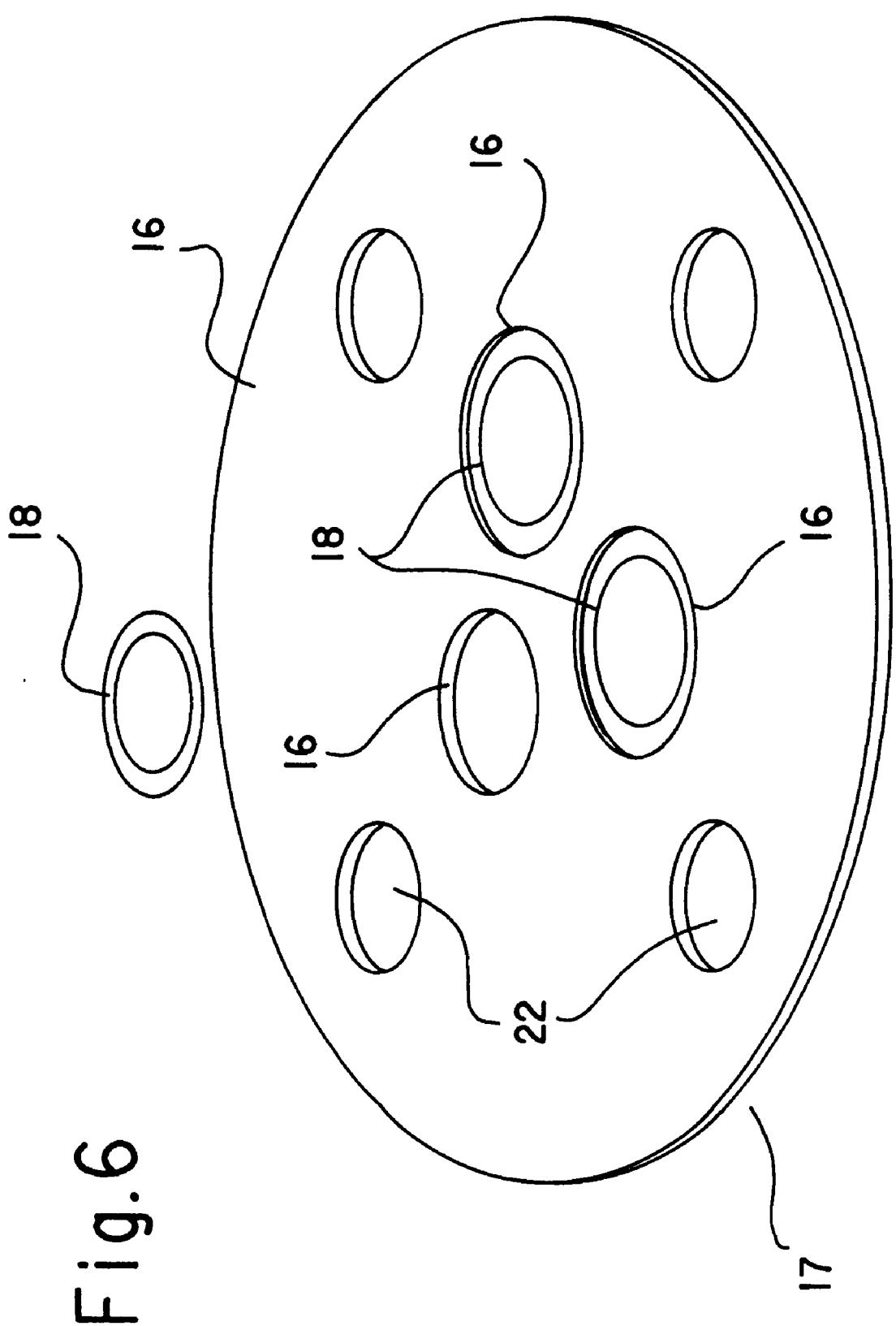
FIG. 6 is a perspective view of a sealing washer.

The sealing washer 17 is also disposed between the attachment flange 23 and the connection flange 21. The sealing washers 17, connection flanges 21 and attachment flanges 23 all have the same diameter. They are provided at the same points with openings 16 for the media that flow through the supply lines 12, 13, and 14 and with openings 22 for the non-illustrated screws, with which the connection is made between the supply lines 12, 13, and 14 and the regulating units 4 or burners 15. The openings 16 in the sealing washers 17 are bounded by metal sealing rings 18 (FIG. 6). This additionally seals off the supply lines 12, 13, 14, so that the connection between the connection flange 21 and the regulating units 4 or the burners 15 can be made that does not leak. The screws are inserted through the openings 22 into the connection flanges 21 and sealing washers 17 and firmly screwed to the regulating units 4 or the attachment flanges 23 of the burners 15.

Figure 1:
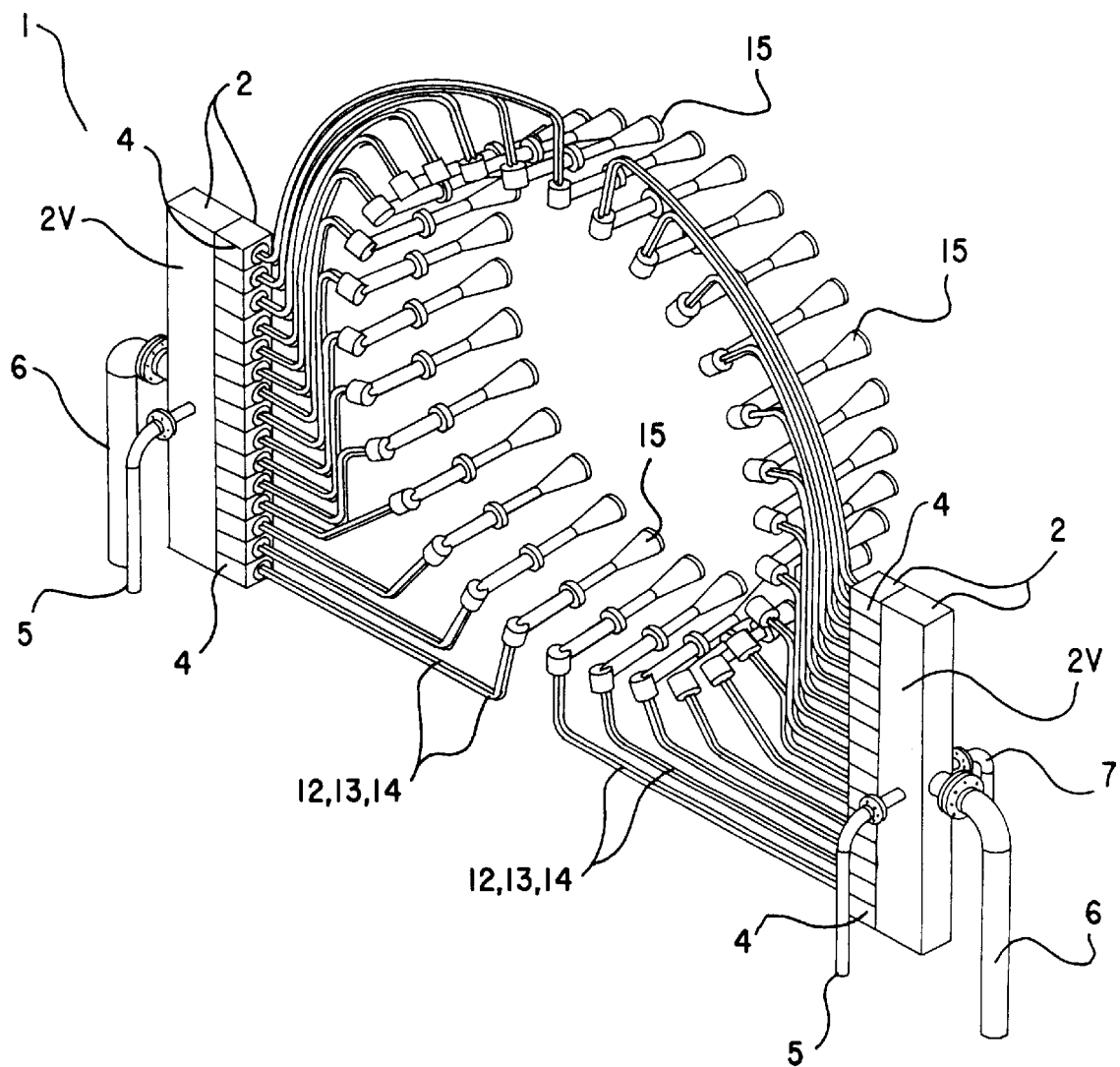
FIG. 1 is a diagrammatic perspective view of a distributor according to the invention.
Figure 2:
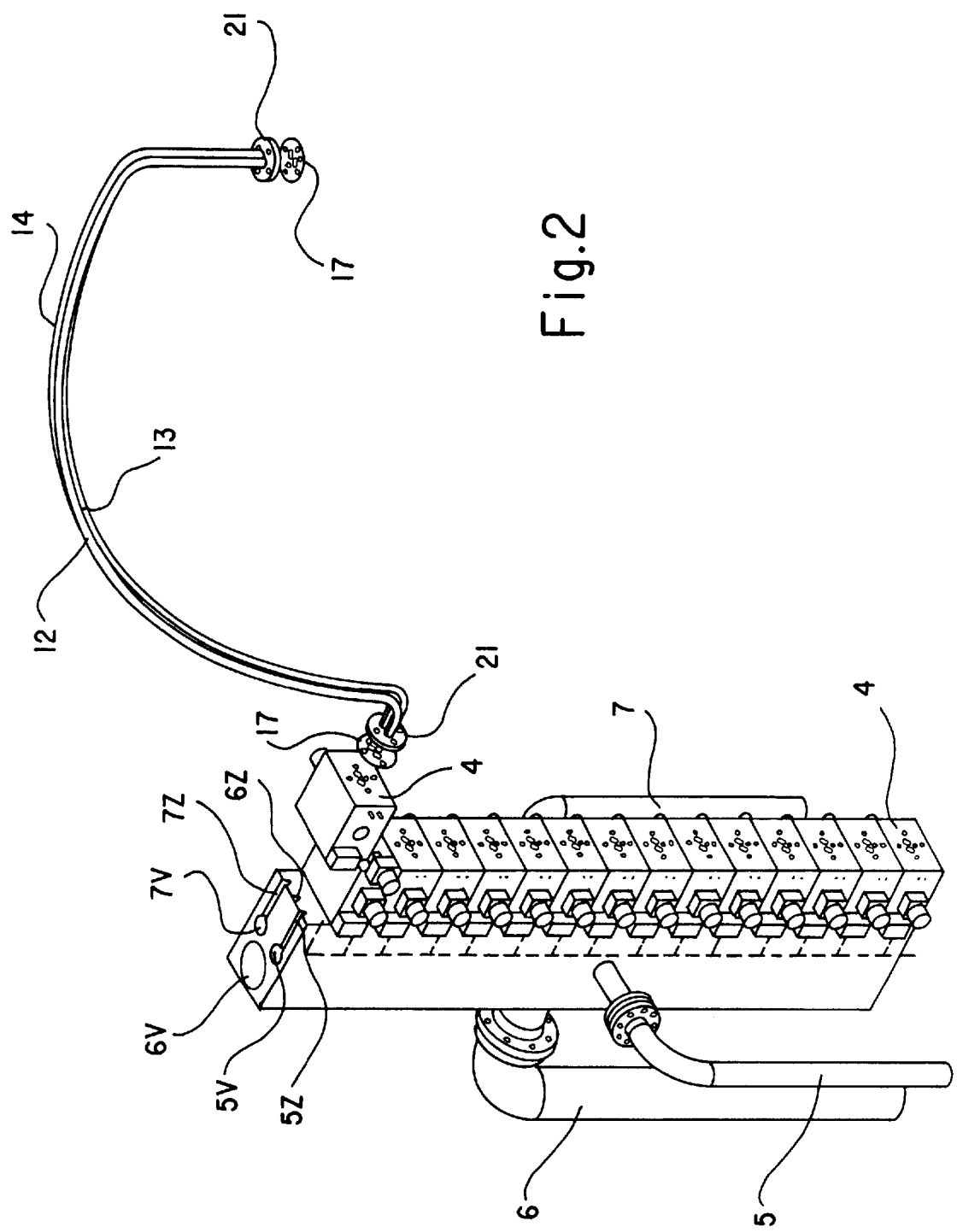
FIG. 2 is a perspective view of a detail of the distributor shown in FIG. 1.
Figure 3:
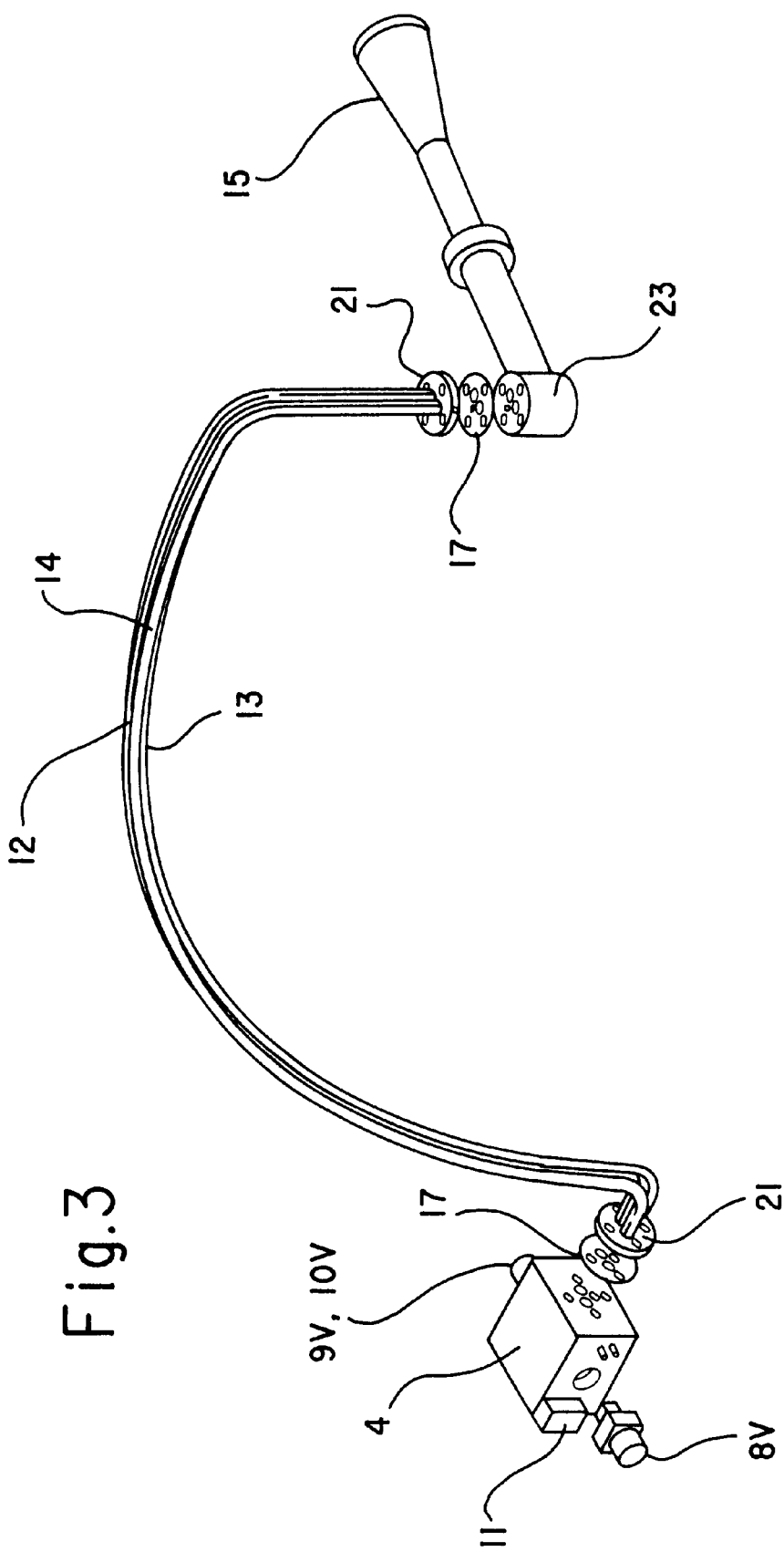
FIG. 3 is a perspective view of a regulating unit that communicates with a burner via three supply lines.

As can be seen from FIG. 1, the two modules 2 are installed parallel to a center axis of a non-illustrated gas turbine to which the burners 15 belong. The modules 2 are mounted in the same plane as the attachment flanges 23 of the burners 15, so as to keep the length of the supply lines 12, 13, 14 as short as possible. As FIG. 1 shows, all the supply lines 12, 13, 14 that branch off from the regulating units 4 are extended around the circularly disposed burners 15, in a common horizontal plane with the burners 15. The three supply lines 12, 13, 14 branching off from each regulating unit 4 are also extended to one burner 15 in such a way that they each have approximately the same length.

We claim:

1. A distributor for supplying burners of a gas turbine with fuel, air and coolant, the distributor comprising:

at least one regulating unit to be connected to each burner of a gas turbine;

at least one supply line connected to said at least one regulating unit and extending to the burner for conducting fuel, air and coolant to the burner;

a distributor unit along with a defined number of regulating units forming a module; and feed lines connected to said distributor unit for conducting the fuel, the air and the coolant to said distributor unit.

2. The distributor according to claim 1, wherein said module is at least two modules provided for supplying a plurality of burners and each of the burners having an attachment flange, each of said at least two modules having at least one of said distributor unit, said regulating units of said distributor unit positioned side by side in a same plane as the attachment flange of the burners.

3. The distributor according to claim 1, wherein said regulating units each have respective connecting lines for receiving the fuel, the air and the coolant, said distributor unit having at least three supply lines with ends extending to an outside and communicating with said feed lines, said distributor unit having, in a vicinity of each of said regulating units, respective branches connected to said respective connecting lines of each of said regulating units.

4. The distributor according to claim 1, wherein each of said regulating units have connecting lines fluidically communicating with said feed lines and said at least one supply line.

5. The distributor according to claim 4, wherein said at least one supply line extending between each of said regulating units and a respective burner has an end with a connection flange, and including sealing washers disposed between said connection flange and each of said regulating units for securing said at least one supply line to each of said regulating units such that said end of said at least one supply line discharges into said connecting lines of each of said regulating units.

6. The distributor according to claim 4, wherein the burner has an attachment flange, and said at least one supply line has a further end with another connection flange and including another sealing washer interpositioned between said other connection flange and the attachment flange of each of the burners for firmly securing said at least one supply line to each of the burners.

7. The distributor according to claim 6, including:

at least one valve disposed in each of said connecting lines;

a measuring and regulating device;

a first signal line connecting said at least one valve to said measuring and regulating device;

a second signal line connected to said measuring and regulating device;

sensors disposed in said connecting lines and connected to said second signal line, said sensors communicating over said second signal line with said measuring and regulating device;

a control system unit; and a field bus line connected between said control system unit and said sensors.

8. The distributor according to claim 7, wherein said regulating and control device is a microprocessor integrated with said at least one regulating unit.

9. The distributor according to claim 7, wherein said at least one supply line is a plurality of supply lines, and including further sensors incorporated into said supply lines upstream of the attachment flange of each of the burners and are connected to said measuring and regulating device of an associated regulating unit and via said field bus lines to said control system unit.

10. The distributor according to claim 2, wherein said at least one supply line is a plurality of supply lines and the burners are disposed in a circle at a predetermined, equal angular spacing from one another, said at least two modules positioned at a spacing from one another such that the burners disposed in the circle are disposed regionally in between said at least two modules, and said supply lines extending parallel, on an outside around the burners, in a vertical plane at a slight spacing from one another from the connection flange of each burner.

* * * * *